United States Patent
Heindl

(10) Patent No.: US 11,047,367 B2
(45) Date of Patent: Jun. 29, 2021

(54) METHOD FOR MONITORING THE CONDITION OF AT LEAST ONE COMPONENT LOADED DURING THE OPERATION OF A WIND TURBINE

(71) Applicant: Stefan Heindl, Essen (DE)

(72) Inventor: Stefan Heindl, Essen (DE)

(73) Assignee: innogy SE, Essen (DE)

( * ) Notice: Subject to any disclaimer, the term of this patent is extended or adjusted under 35 U.S.C. 154(b) by 0 days.

(21) Appl. No.: 16/800,918

(22) Filed: Feb. 25, 2020

(65) Prior Publication Data
US 2020/0248676 A1 Aug. 6, 2020

Related U.S. Application Data

(63) Continuation of application No. PCT/EP2018/072105, filed on Aug. 15, 2018.

(30) Foreign Application Priority Data

Sep. 4, 2017 (DE) ...................... 10 2017 120 284.6

(51) Int. Cl.
*F03D 17/00* (2016.01)
*F03D 80/70* (2016.01)
*F03D 9/25* (2016.01)
*F03D 7/04* (2006.01)

(52) U.S. Cl.
CPC ............. *F03D 17/00* (2016.05); *F03D 80/70* (2016.05); *F03D 7/048* (2013.01); *F03D 9/25* (2016.05); *F05B 2260/80* (2013.01); *F05B 2270/303* (2013.01)

(58) Field of Classification Search
CPC .......... F03D 17/00; F03D 80/70; F03D 80/80; F03D 80/88; F03D 7/048; F03D 9/25; F05B 2260/80; F05B 2270/303
See application file for complete search history.

(56) References Cited

U.S. PATENT DOCUMENTS 9,803,618 B2 * 10/2017 Bankestrom ............ F03D 80/70

FOREIGN PATENT DOCUMENTS

| DE | 10 2011 052 894 A1 | 3/2012 | |
|---|---|---|---|
| EP | 1 650 431 A2 | 4/2006 | |
| EP | 2 927 662 A1 | 10/2015 | |
| EP | 2927662 A1 * | 10/2015 | ............. F03D 80/70 |

* cited by examiner

*Primary Examiner* — Richard A Edgar
(74) *Attorney, Agent, or Firm* — Reinhart Boerner Van Deuren P.C.

(57) ABSTRACT

The application relates to a method for monitoring the condition of at least one component of a wind turbine which is loaded during the operation of the wind turbine. In the method, a first temperature of a first loaded component of the wind turbine is sensed. The method further involves sensing of at least one further temperature of a further loaded component of the wind turbine. The first loaded component and the further loaded component have a thermal coupling to each other, and a damage of at least one of the loaded components is detected based on the sensed first temperature and the sensed further temperature and at least one admissibility criterion in an evaluation step.

15 Claims, 7 Drawing Sheets

METHOD FOR MONITORING THE CONDITION OF AT LEAST ONE COMPONENT LOADED DURING THE OPERATION OF A WIND TURBINE

CROSS-REFERENCE TO RELATED PATENT APPLICATIONS

This patent application is a continuation of PCT/EP2018/072105, filed Aug. 15, 2018, which claims priority to German Application No. 10 2017 120 284.6, filed Sep. 4, 2017, the entire teachings and disclosure of which are incorporated herein by reference thereto.

FIELD

The application relates to a method for monitoring the condition of at least one component of the wind turbine loaded during the operation of a wind turbine, comprising sensing a first temperature of a first loaded component of the wind turbine. In addition, the application relates to a monitoring system.

BACKGROUND

A constant concern for a wind turbine, in particular an offshore wind turbine, is the monitoring of the loaded components and parts, respectively, of the wind turbine. A loaded component is in particular a component of a wind turbine which is exposed to loads during the operation of the wind turbine. In other words, in this case forces act on the component which can cause damage to the component.

In order to sense a damage, in particular at an early stage, it is known from the state of the art EP 2 927 662 A1 to install a temperature monitoring system for a loaded component, for example a rolling bearing of a wind turbine. In particular, in accordance with the state of the art it is proposed to sense the temperature of the loaded component and the ambient temperature. By normalizing the temperature of the component with the ambient temperature, a corresponding temperature trend becomes more meaningful.

In practice, however, the method has not proved sufficiently reliable. Depending on the measuring point of the ambient temperature and/or the design of the wind turbine including the corresponding components, in particular bearings, this method did not always lead to the desired clarity of the results. Rather, possible temperature trends remained hidden in the uncertainties and damages of a component were only discovered at a late stage or not at all.

Since it has not been possible to derive reliable and significant results from the temperature measurement of a loaded (stressed) component up to now, in practice wind turbines are additionally equipped with a so-called Condition Monitoring System (CMS). A CMS is configured to monitor oscillations and vibrations of the wind turbine in order to sense changes and deterioration in condition at an early stage. However, the acquisition, installation and operation of such a system are associated with a high effort and corresponding costs.

BRIEF SUMMARY

Therefore, the object of the present application is to provide a method for monitoring the condition of at least one component of the wind turbine which is loaded during the operation of a wind turbine, which enables the detection of a damage of a loaded component in a reliable manner and with little effort, in particular at an early stage.

According to a first aspect of the application, the object is solved by a method for monitoring the condition of at least one component of a wind turbine loaded during the operation of the wind turbine according to claim 1. The method comprises the sensing of a first temperature of a first loaded component of the wind turbine. The method comprises:

sensing of at least one further temperature of a further loaded component of the wind turbine,
wherein the first loaded component and the further loaded component have a thermal coupling with each other, and
detecting of a damage of at least one of the loaded components based on the sensed first temperature and the sensed further temperature and at least one admissibility criterion in an evaluation step.

In contrast to the state of the art, according to the application, by sensing the respective temperature of two loaded components which have a thermal coupling with each other, and by evaluating these temperature data for the detection of a possible damage of at least one of the components, a damage of a loaded component is detected reliably and with little effort at an early stage. Additional monitoring systems, such as CMS, can be omitted.

A wind turbine, for example an offshore wind turbine, is generally configured to convert the kinetic energy of the wind into electrical energy by means of a rotor and a generator. A wind turbine according to the present application has a plurality of components that are subjected to loads during operation. According to the application, a loaded component is a part and component, respectively, on which a load and a force, respectively, is applied during operation.

According to the application, it is provided that temperature monitoring is carried out on at least two, preferably exactly two, loaded components. The loaded components have a thermal coupling with each other. In this case, thermal coupling means that the first and the further component have at least a similar temperature behavior and at least similar environmental conditions. In particular, thermal coupling is deemed to be present according to the application if the first component and the second component experience at least a similar (mechanical and/or electrical) load (stress) and, for example, have similar environmental conditions (e.g. are arranged in the same housing or the like). Preferably, a pair of components consisting of two thermally coupled components can always be monitored in accordance with the application.

For example, a temperature sensing device may be provided in the wind turbine to sense the first temperature of the first loaded component and/or the further temperature of the further loaded component.

It has been recognized that in particular the sensed temperature data of two thermally coupled components, which in particular experience at least a similar, preferably identical, load, are good indicators of a damage of at least one of the monitored components.

In particular, according to the application, an evaluation step is provided to detect a damage of at least one of the loaded components based on the first temperature and the further temperature and at least one admissibility criterion. According to the application, a damage in this context also means a possible (future) damage of the component and damage at an early stage, respectively. For example, in the evaluation step, a comparison operation of the sensed first and further temperature data with each other and/or with an admissibility criterion (e.g. an admissible temperature range and/or at least one admissible temperature limit value) can be performed. A method for early and, in particular, reliable identification of damaged components is provided in accordance with the application.

According to a first embodiment of the method according to the application, the method may comprise:
  determining a differential temperature by forming the difference between the first sensed temperature and the further sensed temperature,
  wherein in the evaluation step a damage of at least one of the loaded components is detected based on the formed differential temperature and the at least one admissibility criterion.

In particular, according to the application, it has been recognized that a differential temperature of at least similarly loaded components is a particularly good indicator for early detection of damages. By forming the difference, the temperature data are compared with each other in such a way that (almost) only the influence of the load on the respective components remains. In the fault-free operation of the loaded components, this leads in particular thereto—due to the at least similar loads of these components—that a specific temperature level (ideally, for example, approx. 0° C.) is available as the differential temperature. In the event that one of the components is damaged, the detected temperature of this component changes (in particular, the temperature increases) and thus the differential temperature or the specific temperature level. In particular, the specific (e.g. ideal) temperature level (with a tolerance range, if necessary) can be used as an admissibility criterion. Damage can be detected in a particularly reliable manner.

According to a further embodiment of the method, an alarm message can be generated and preferably sent to at least one terminal device when a damage is detected. Alternatively or additionally (automatically) measures can be taken to prevent at least a further damage. For example, if a damage is (early) detected (and the alarm message is received, respectively), operational measures can be initiated (e.g. increased re-greasing, closely monitoring, and/or replacement of a grease (oil) introduced into a component (e.g. bearing)) and/or, in the event of a further damage, replacement or repair of the damaged component can be planned in good time. This will at least prevent longer operational failures of the wind turbine.

Preferably, the at least one admissibility criterion may include at least one reference temperature, in particular at least one differential reference temperature, of at least one (fault-free operating) reference wind turbine. For example, at least a number of wind turbines in a wind energy system (or different wind energy systems) can be monitored as described above. For example, a first component and a further component of a first wind turbine and the (essentially) same first component and the (essentially) same further component of a further wind turbine (according to claim 1) can be monitored. In particular, a plurality of wind turbines can be monitored accordingly. As admissibility criteria, the first and further temperatures, in particular the differential temperature resulting from these temperature data, can be used as reference temperature and differential reference temperature, respectively, of the at least one further (faultlessly operating) wind turbine.

In the evaluation step, in particular the sensed first temperature and further temperature and the corresponding differential temperature, respectively, as well as the reference temperature(s) and differential reference temperature, respectively, can be evaluated in a comparison step. A damage of a component can be detected in particular by detecting a deviation between the reference temperature and differential reference temperature, respectively, and the sensed first and further temperatures and the differential temperature, respectively. A damage can be detected in a particularly reliable way.

The differential reference temperature can be essentially parallel in time to the corresponding differential temperature. Alternatively, the reference temperature can be taken from a further time period of the same wind turbine (trend) or a further comparable time period of a comparable wind turbine.

In addition, according to a further embodiment of the method, the sensing of a first temperature may comprise the sensing of a first (time-dependent) temperature profile during a specific time period. For example, an (almost) continuous measurement (monitoring) of the first temperature can be carried out. Preferably, the specific time period can be divided into a plurality of time intervals. For example, for each time interval (e.g. 10 min, preferably at least 1 h, 1 day or 1 month) a temperature mean value can be formed (and stored) for the first temperature values measured (almost) continuously during this time interval.

In addition, the sensing of a further temperature can comprise the sensing of a further (time-dependent) temperature profile during a specific time period. For example, an (almost) continuous measurement (monitoring) of the further temperature can be carried out. Preferably, the specific time period can be divided into a plurality of time intervals. For example, for each time interval (e.g. 10 min, 1 h, 1 day, 1 month) a temperature mean value can be formed (and stored) for the further temperature values measured (almost) continuously during this time interval.

The determining of a differential temperature can comprise the determining of a differential (time-dependent) temperature profile by forming the difference between the sensed first temperature profile and the sensed further temperature profile. It goes without saying that a time-synchronous determination of the differential temperature profile can be carried out. In other words, for example, a difference is formed between a first mean temperature value of a first time interval and a further mean temperature value of said first time interval. Accordingly, a difference calculation can be carried out for a specified number of further time intervals. Preferably, in this embodiment, the differential reference temperature can be in particular a differential reference temperature profile.

The load on a component during operation of the wind turbine is (directly or indirectly) dependent on in particular the electrical power generated by the wind turbine. It has been recognized that the temperatures of the first and further components, in particular the corresponding differential temperature, also depend on the generated electrical power. Thus, the temperature level described above can change depending on the generated electrical power. According to the application, it is therefore proposed in accordance with an embodiment form that the method comprises
  Sensing of the power generated by the wind turbine while sensing the first temperature profile and the further temperature profile,
  wherein in the evaluation step temperature values of the differential temperature profile of at least one predeterminable time interval are assigned to the associated power values of the generated power during the time interval.

By evaluating the differential temperature profile depending on the respectively generated power, the evaluation can be further improved. In particular, the differential temperature T(t1) determined during generating of a power P(t1) can be assigned to the differential temperature. For example, the differential temperature can be plotted against the electrical power generated by the wind turbine for evaluation purposes. In particular, the determined mean value of a differential temperature of a first time interval can be assigned to a formed mean value of the generated power of the first time interval.

In accordance with a further preferred embodiment, at least one temperature extremum (also called operative operating point) can be determined in the evaluation step from the temperature values of the differential temperature profile, which have been assigned to the associated power values for the at least one predeterminable time interval. The admissibility criterion can be at least one reference temperature extremum of a differential reference temperature of at least one (faultlessly operating) wind turbine. In particular, a damage can be detected at an early stage by evaluating the operative operating point. The evaluation can, for example, comprise a temporal evaluation and/or comprise the comparison with at least similarly formed wind turbines.

Preferably, a plurality of temperature extremes from a correspondingly plurality of time intervals can be evaluated in the evaluation step. In particular, from the temporal profile of the temperature extremes a damage can be derived. For example, a specific time-dependent and maximum permissible change can be used as an admissibility criterion. In particular, in accordance with a further embodiment, it may be provided that the evaluating comprises the detecting of changes in temperature extremes, in particular increases in temperature extremes. If such a change is detected, this is a particularly reliable indicator of a damage of a component. In particular, herewith a damage can be reliably detected at an early stage.

As described, two components (a pair of components) are monitored in parallel. In order to determine which of the two loaded components actually has a damage, it is proposed, in accordance with a further embodiment of the method in accordance with the application, that in the evaluation step, when a damage of a loaded component is detected, the loaded component which (actually) has the damage is identified from the two loaded components by evaluating the sign of the change in the differential temperature. For example, an increased differential temperature may indicate a damage of the first component and a reduction in the differential temperature may indicate a damage of the further component (or vice versa, depending on the difference calculation). In particular, it can be assumed that the measured temperature of a loaded component will increase if it is damaged.

According to a particularly preferred embodiment, the first loaded component and the further loaded component can each be a mechanically loaded component. In particular, a loaded component can be a rotor bearing, generator bearing or gearbox bearing. The thermal coupling in accordance with the application may be present in particular due to a shaft used jointly by the at least two components, in particular bearings. In addition, the two components can be arranged in the same housing, for example.

Alternatively or additionally, the first loaded component and the further loaded component can each be an electrically loaded component, in particular a transformer or converter. Thermal coupling can be achieved in particular by an essentially identical electrical load (e.g. similar electrical power and/or current and/or voltage). In this case, too, the two components can be arranged in the same housing, for example. It shall be understood that preferably a plurality of component pairs of a wind turbine are monitored.

In particular, the application may provide for the joint monitoring of two similarly loaded components (with similar ambient conditions (in particular at least similar ambient temperature, e.g. $\Delta T<25°$, in particular $\Delta T<10°$ C.)) and preferably for the evaluation of their differential temperature or their differential (temporal) temperature profile. For example, in the wind turbine a plurality of such component pairs can be identified and monitored.

A further aspect of the application is a monitoring system for monitoring the condition of at least one component of a wind turbine that is loaded during the operation of the wind turbine. The monitoring system comprises at least one temperature sensing device, configured to sense a first temperature of a first loaded component of the wind turbine. The temperature sensing device is configured to sense at least one further temperature of a further loaded component of the wind turbine. The first loaded component and the further loaded component have a thermal coupling with each other. The monitoring system comprises at least one evaluation device, configured to detect a damage of at least one of the loaded components based on the first temperature and the further temperature and at least one admissibility criterion in an evaluation step.

The monitoring system can be used, for example, for a single wind turbine or for a wind energy system and wind farm, respectively, with a plurality of wind turbines that are at least similar in design. The monitoring system may in particular be operated in accordance with the method described above.

The temperature sensing device can, for example, be made up of different modules. The evaluation device can be located in the wind turbine or in a further wind energy facility (e.g. central control computer, SCADA system, e.g. of a head-end station or similar) or in a computer center. In particular in the latter case, the evaluation device can be a central evaluation device which can monitor a plurality of wind turbines and their respective loaded components. This makes it possible to use the faultlessly working wind turbines as reference wind turbines and thus the temperature data of these reference wind turbines as an admissibility criterion. For example, a wireless and/or wired communications network may be used for the exchange of data between the different facilities. The alarm messages described above can also be at least partially transmitted via this.

It should be noted that in the present case the term 'power' is to be understood as 'active power' unless otherwise specified. It should also be noted that the controller device can determine the at least one power set point based on a majority of the criteria described above. In addition, devices, modules, etc. that are in accordance with the application can be made up of hardware components (e.g. processors, interfaces, storage media, etc.) and/or software components.

The features of the monitoring systems and monitoring methods can be freely combined with each other. In particular, features of the description and/or the dependent claims, even if completely or partially circumventing features of the independent claims, may be independently inventive, either alone or freely combined.

There is now a wide range of possibilities to design and develop the monitoring method according to the application and the monitoring system according to the application. In this respect, reference is made on the one hand to the claims subordinate to the independent claims and on the other hand to the description of embodiments in connection with the drawing.

DETAILED DESCRIPTION

Figure 1:
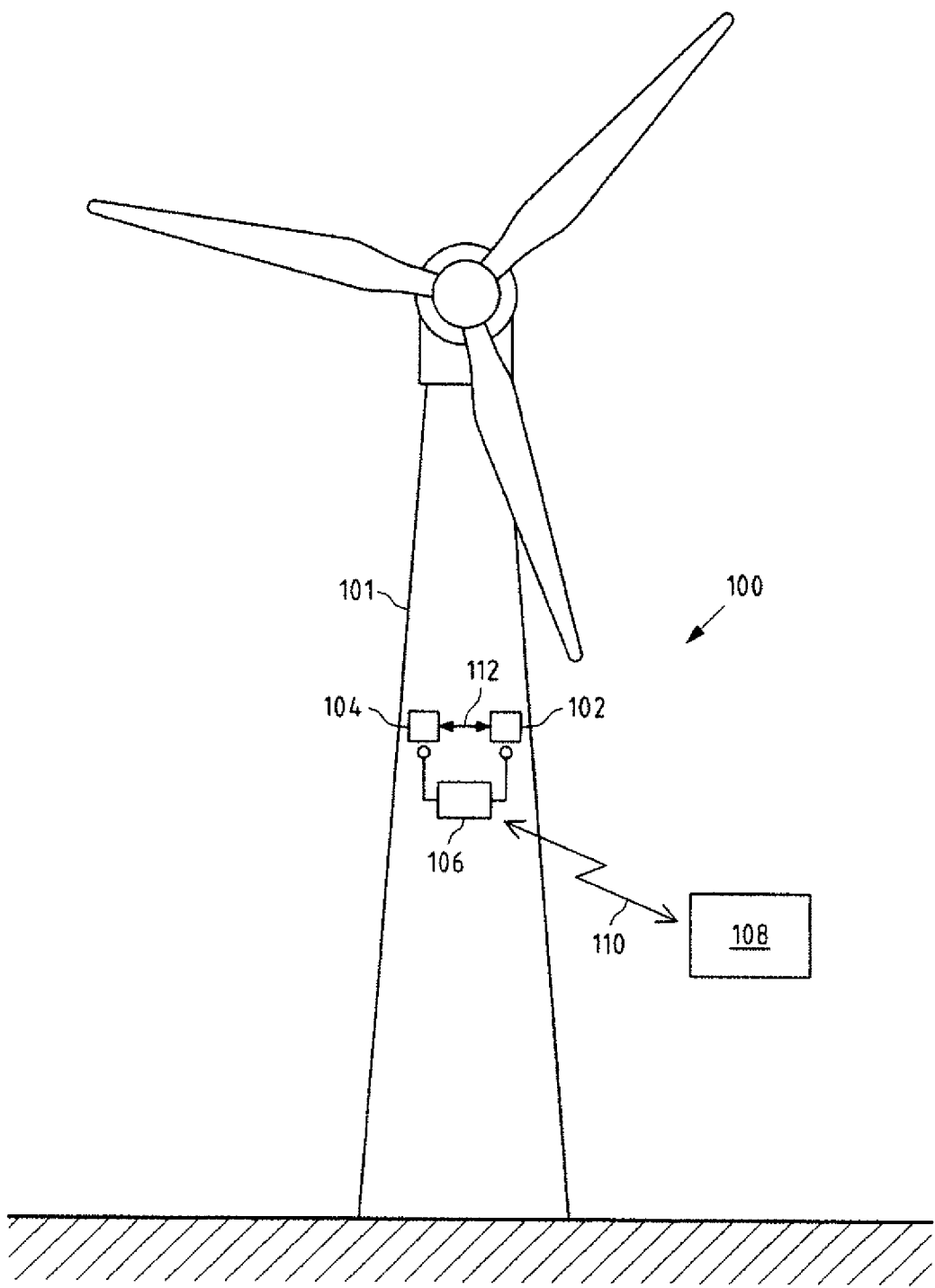
FIG. 1 shows a schematic view of a first embodiment of a monitoring system according to the present application.

In the following, the same reference characters are used for same elements.

FIG. 1 shows a schematic view of an embodiment of a monitoring system 100, configured to monitor the condition of at least one component 102, 104 of a wind turbine 101 which is loaded during the operation of the wind turbine 101.

The wind turbine 101 is configured to convert kinetic energy of the wind into electrical energy. For this purpose, a plurality of components 102, 104 are arranged in the wind turbine 101. For the sake of a better overview, only two components 102, 104 are shown schematically.

The components 102, 104 experience a mechanical load and/or an electrical load (stress) during operation, i.e. in particular during the conversion of kinetic energy into electrical energy. Hereby, the load that each component experiences is (essentially) the same. In particular, a first loaded component 102 and a further loaded component 104 are arranged. In order to detect a damage of at least one of the components 102, 104 at an early stage, a common temperature monitoring of the two loaded components 102, 104 is provided in accordance with the application. The two components 102, 104 therefore form a pair of components.

As already described, a thermal coupling 122 exists between the loaded components 102, 104 due to the essentially identical load. In this application, thermal coupling generally means that the temperature difference in fault-free operation is within a specific range (e.g. ΔT between 0° C. and 20° C., preferably between 0° C. and 10° C., particularly preferably between 0° C. and 5° C.). The range may depend on the type of load.

As can be seen, the monitoring system 100 comprises at least one temperature sensing device 106. The temperature sensing device 106 is configured to sense a first temperature of the first loaded component 102. In addition, the temperature sensing device 106 is configured to sense a further temperature of a further component 104. For example, a measuring sensor can be arranged on the respective component 102, 104 and/or in the respective component 102, 104.

In particular, the temperature sensing device 106 can be configured to determine the respective temperature (almost) continuously. It shall be understood that a suitable sampling rate can be used to limit the temperature values to be processed to a desired number. An (almost) continuous sensing enables the sensing of a (time-dependent) temperature profile. It shall be understood that the temperature sensing device can also be formed by separate elements.

In the present embodiment, the sensed temperature data can be transmitted to a remotely located evaluation device 108 (e.g. integrated in a central control computer). In particular, a wireless communication network 110 is provided for this purpose. The temperature sensing device 106 and the evaluation device 108 may have suitable transmission means (transmitter, receiver). It shall be understood that according to other variants of the application, the evaluation device may also be integrated in the wind turbine and, for example, a wired communication network is provided.

The evaluation device 108 is configured to detect a damage of at least one of the loaded components based on the first temperature and the further temperature and at least one admissibility criterion in an evaluation step. A more detailed description of the evaluation is given below.

Figure 2:
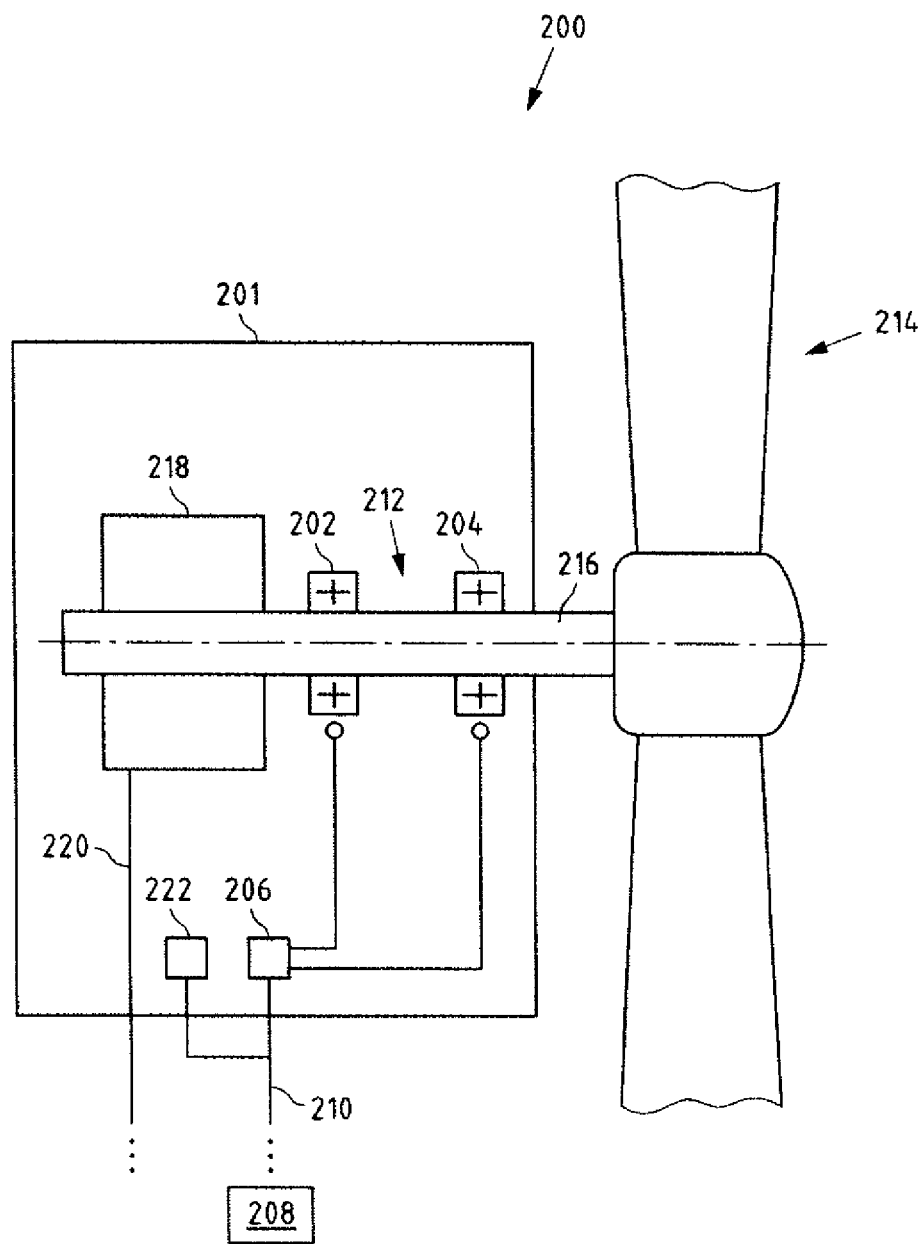
FIG. 2 shows a schematic view of a further embodiment of a monitoring system according to the present application.

FIG. 2 shows a further embodiment of a monitoring system 200 according to the present application. In order to avoid repetition, only the differences to the embodiment according to FIG. 1 are described below. For the other components of the monitoring system 200, we refer in particular to the above explanations.

The shown wind turbine 201 comprises a wind wheel 214. The wind wheel 214 is connected to a generator 218 via a shaft 216. The shaft 216 is in parts and the generator 218 is completely installed inside the housing of a nacelle of the wind turbine 201.

The part of the shaft 216 guided in the housing is supported by two roller bearings 202, 204, in particular a front and a rear roller bearing 202, 204. In particular, both bearings are located in a common housing. In generator 218, the rotational energy obtained from the wind energy via wind wheel 214 is converted into electrical energy and, as shown schematically, fed via cable 220 to a (not shown) converter.

In the present embodiment, the first bearing 202 represents the first loaded component 202 and the further bearing 204 represents the further loaded component 204. A temperature sensor with a temperature sensing device 206 is arranged on each of the bearings 202, 204. The measured values of the temperature sensors are fed to the temperature sensing device 206 and the measuring sensor 206, respectively.

In addition, measured power values about the power produced by the wind turbine 201 are fed from the generator 218 or another location to a power sensing device 222. In particular, a (time-dependent) power profile is sensed by the power sensing device 222. In addition to these parameters, a plurality of further sensing devices can be provided for sensing further parameters.

The respective sensing device 206, 222 can transmit data, for example, by wire via a communications network 210 to an evaluation device 208 of a (not shown) central control computer. In this central control computer the data can be stored in a SCADA data record. The SCADA system stores, for example, for specific time intervals (measuring intervals), for example 10 minutes each, the mean values of the various measured values transmitted by the respective sensing device 206, 222.

In particular, it is proposed that the first and further temperature values and preferably the power data are evaluated. The method for operating, in particular for evaluating the data, a monitoring system according to FIG. 2 is explained in more detail in FIG. 3.

Figure 3:
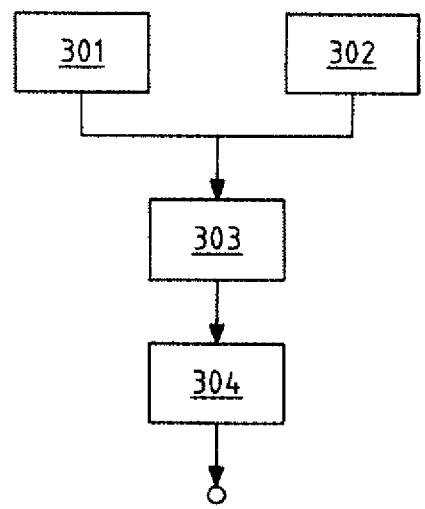
FIG. 3 shows a diagram of an embodiment of a method according to the present application.

FIG. 3 shows a diagram of an embodiment of a method for monitoring the condition of at least one component 202, 204 of the wind turbine 201 wherein the component 202, 204 is loaded during the operation of the wind turbine 201 according to the present application.

In a first step 301, a first temperature of the first loaded component, in this example the first bearing 202 of the wind turbine 201, is sensed. In particular, a first (time-dependent) temperature profile can be sensed in the manner described above, wherein mean values can be formed (calculated) for the various time intervals.

In particular parallel to step 301, a further temperature of the further loaded component, in this example the further bearing 204 of the wind turbine 201, is sensed in step 302. In particular, a further (time-dependent) temperature profile can be sensed in the manner described above, wherein mean values can be formed (calculated) for the various time intervals.

Parallel to this, the power, in particular a (time-dependent) power profile of the power generated by the wind turbine 201, can be sensed in a (not shown) step as described above, wherein mean values can be formed (calculated) for the various time intervals.

In a next step 303, at least the temperature data sensed according to steps 301 and 302 are evaluated in such a way that a damage of one of the bearings 202, 204 can be detected. Preferably, the detecting of a damage of at least one of the loaded bearings 202, 204 based on the first temperature and the further temperature and at least one admissibility criterion may initially comprise the determining of a differential temperature, in particular a differential temperature profile, of the first and further temperature data. In particular, the difference can be determined from the first temperature profile of the first bearing 202 and the further temperature profile of the further bearing 204. For example, difference mean values can be determined from the respective mean values for each measuring interval and time interval, respectively.

Figure 4:
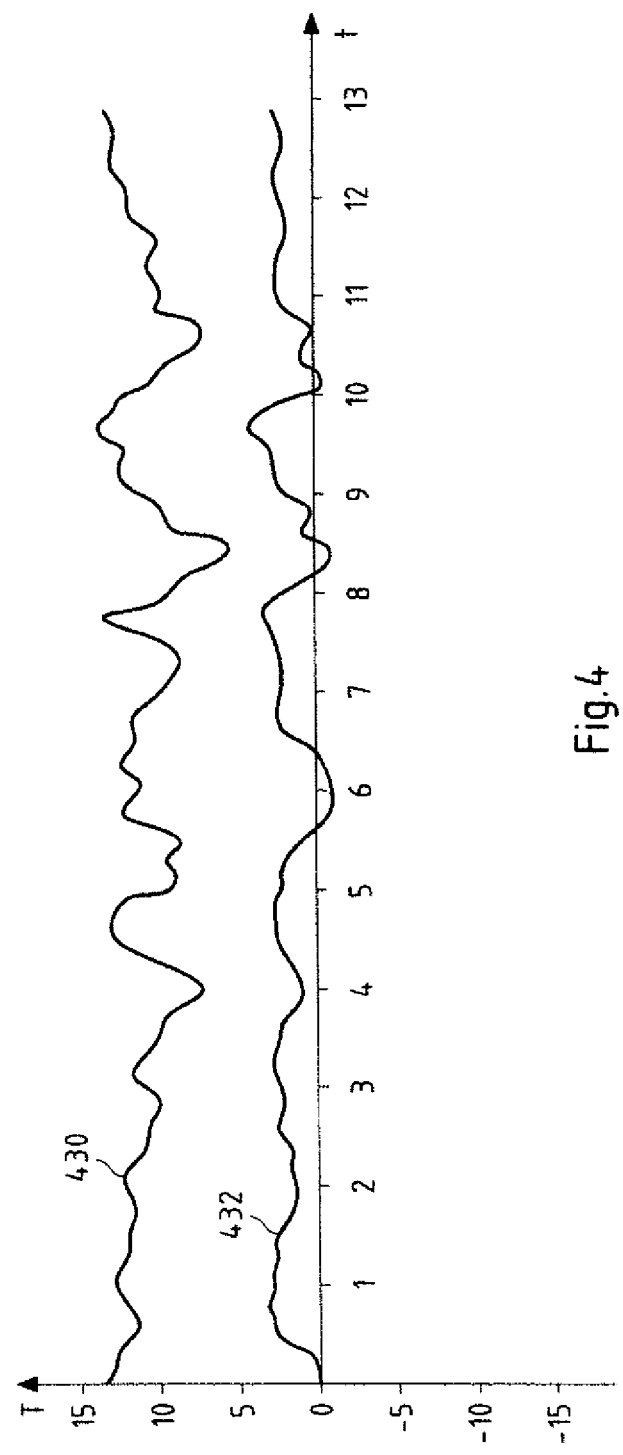
FIG. 4 shows a diagram with exemplary differential temperature profiles according to the present application.

Exemplary differential temperature profiles 430 and 432 are shown in FIG. 4. While the temperature T (e.g. in ° C. or K) is plotted on the Y-axis, the X-axis represents the time axis t (e.g. in days). As already mentioned, the two bearings 202, 204 are mounted on a shaft 216 (i.e. experience essentially the same load) and are also in the same environment (nacelle housing), so that in the present embodiment both bearings 202, 204 are thermally coupled. As has been described, the temperature data can be matched by the difference calculation, so that (almost) only the influences from the bearing load due to the generated wind turbine power and the friction acting in the respective bearing 202, 204 remain.

As has been described, the plotting of the differential (bearing) temperature over the time axis is shown in FIG. 4, where the differential temperature profile represents 432 faultlessly operating components and a faultlessly operating wind turbine, respectively. In particular, the temperature level of the differential temperature profile 432 runs around 0 (ideal case). This differential temperature profile 432 can be used in particular as a differential reference temperature profile of a reference wind turbine, i.e. as an admissibility criterion.

The further shown differential temperature profile 430 shows a profile in which a loaded component is damaged. This results from the fact that the differential temperature profile 430 has a higher temperature level (approx. 12° C.) compared to the differential reference temperature profile 432. In the evaluation step, a comparison of a specific differential temperature profile with a differential reference temperature profile can therefore be carried out. If the deviation exceeds a predetermined threshold, a damage of a component can be derived and it can be continued with step 304.

In practice, in particular a plurality of at least similarly constructed wind turbines and their loaded components (e.g. the above-mentioned bearings), respectively, can be monitored. In this case, tests have shown that a damage can be detected if the differential temperature profile with the damaged component differs significantly from the differential temperature profiles of all other wind turbines.

If a corresponding detection is detected, an alarm message can be generated in step 304 and transmitted to a terminal device, for example. In particular, the user of the terminal device can then take appropriate measures, for example to repair the damage or to carry out further testing.

Figure 5:
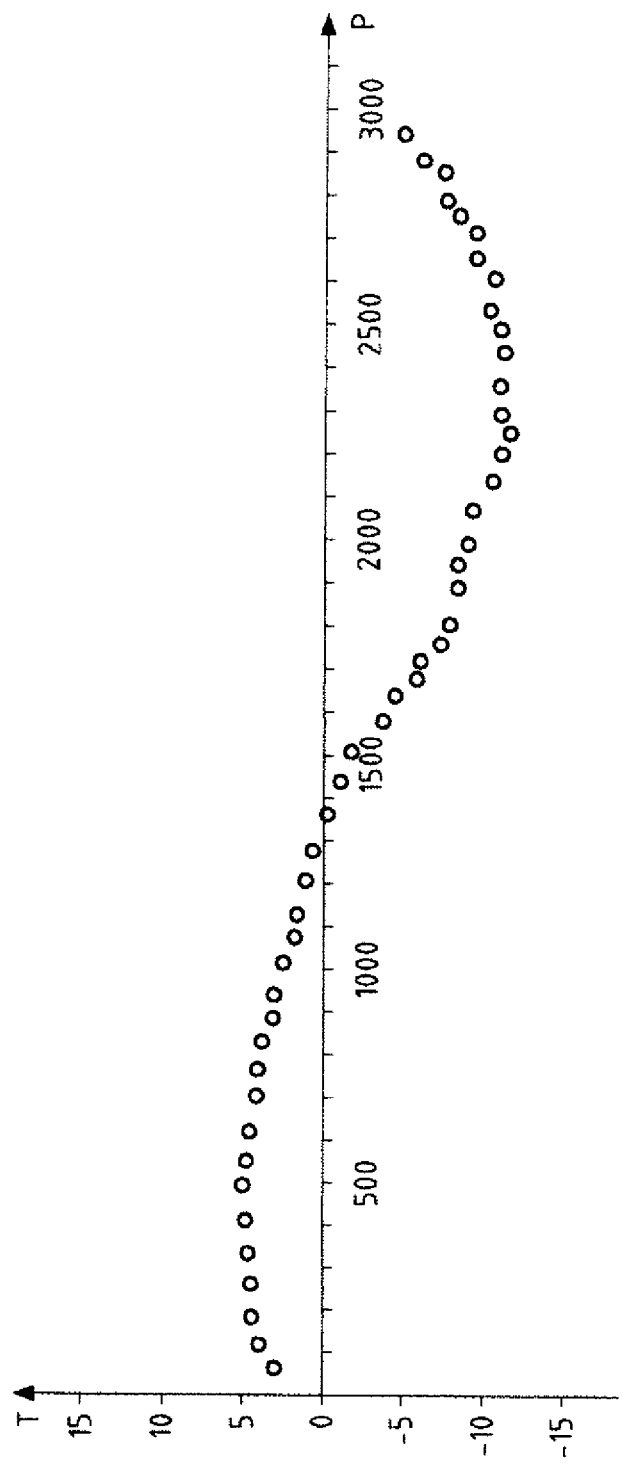
FIG. 5 shows a diagram with an exemplary profile of the differential temperature values depending on the generated power according to the present application.

As described above, the differential temperature may depend on the generated electrical power. This dependence is shown in FIG. 5. FIG. 5 shows a diagram where the differential temperature values are plotted against the electrical power of the wind turbine.

The exemplary profile in FIG. 5 is particularly characteristic for a specific configuration of the two bearings 202, 204 and the current condition. The profiles of wind turbines with the same configuration therefore have similar profiles. Therefore, it has been recognized according to the application that in an evaluation step 303 (as an alternative or in addition to the evaluation described above) the profile can be evaluated. In particular, a change in this profile over time and/or a different profile of at least two wind turbines of (almost) the same configuration can be interpreted as an indicator of a damage, such as a bearing damage. If a corresponding detection is detected, it can be continued with step 304.

It has also been recognized that specific points on the profile are particularly suitable for evaluation. In particular, the point at which the differential temperature reaches an extremum, in particular a maximum, has proved to be characteristic. Consequently, as an alternative or in addition to the evaluation options described above, an evaluation based on this characteristic point can be performed in the evaluation step.

Figure 6:
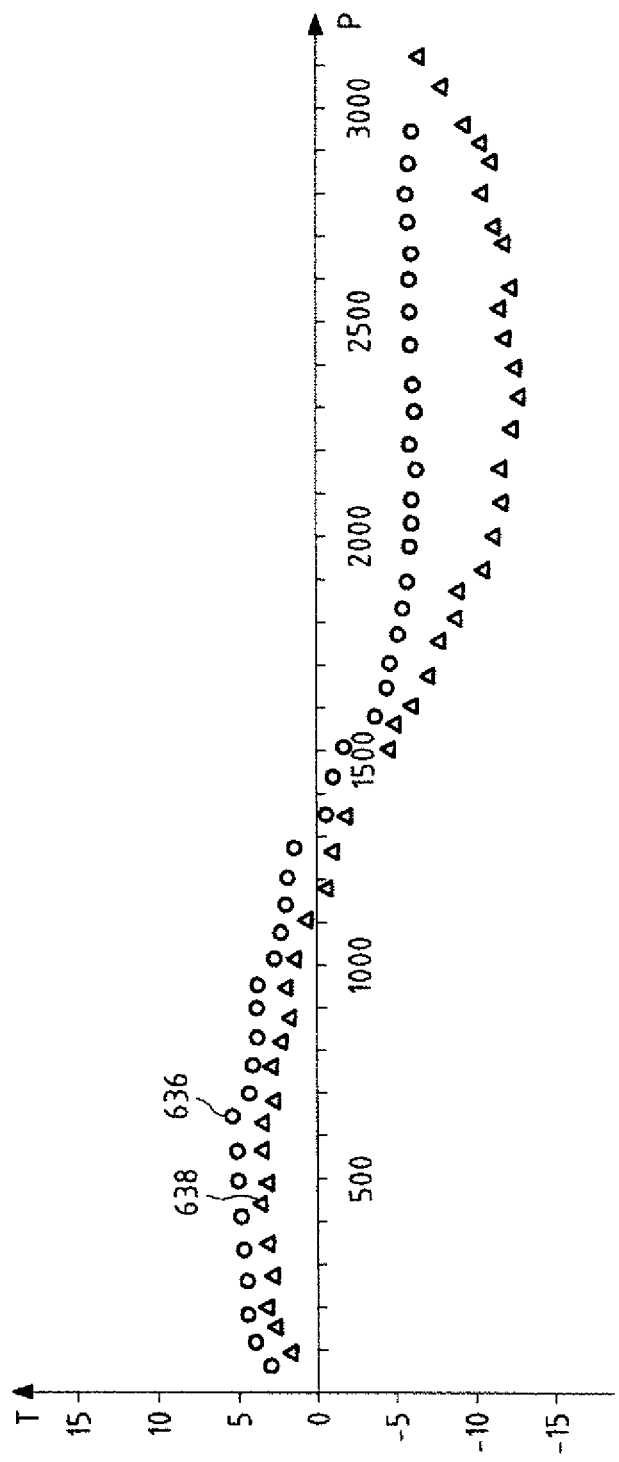
FIG. 6 shows a diagram with exemplary profiles of the differential temperature values depending on the generated power according to the present application.

FIG. 6 shows two exemplary differential temperature values plotted against the power. Here, the differential temperature values result from the same bearings of the same wind turbine, but sensed at different times. The profile (triangles) resulting from the temperature data of bearings 202, 204 sensed at an initial point in time (for example day X or month X) shows a temperature extremum 638 at a power of approx. 450 kW.

The further profile (circles) resulting from the temperature data of bearings 202, 204 sensed at a further point in time (for example day Y or month Y) shows a temperature extremum 636 at a power of approx. 650 kW. The further point in time is in particular a point in time after the first point in time (Y=X+Z).

As can be seen, the temperature extremum, also known as the operative operating point, has shifted from the first point in time to the second. In the evaluation step, a corresponding comparison can be carried out (as an alternative or in addition to the above evaluation options). For example, the admissibility criterion may be a maximum permissible change. Exceeding this change can be interpreted in the evaluation step as an indicator of a damage of at least one bearing 202, 204. In particular, a change in the operational operating point 636, 638 is an indication of changes in the friction conditions in a bearing 202, 204 and thus of a possible damage of a bearing 202, 204.

A particularly reliable detection of a damage of a loaded component can be achieved if a plurality of temperature extremes from a corresponding plurality of time intervals are evaluated in the evaluation step (alternatively or additionally). The evaluation may preferably comprise the detecting of changes in temperature extremes, in particular increases in temperature extremes. In other words, a determination and a corresponding plotting of the temperature extremes and the operative operating points, respectively, over time can reliably show possible changes in the loaded components. In particular, this embodiment of evaluation in accordance with the application makes it possible to reliably detect even the smallest changes in the loaded and monitored components, so that a damage of a component can be identified at an early stage, in particular many months before a condition that could endanger operation occurs.

Figure 7:
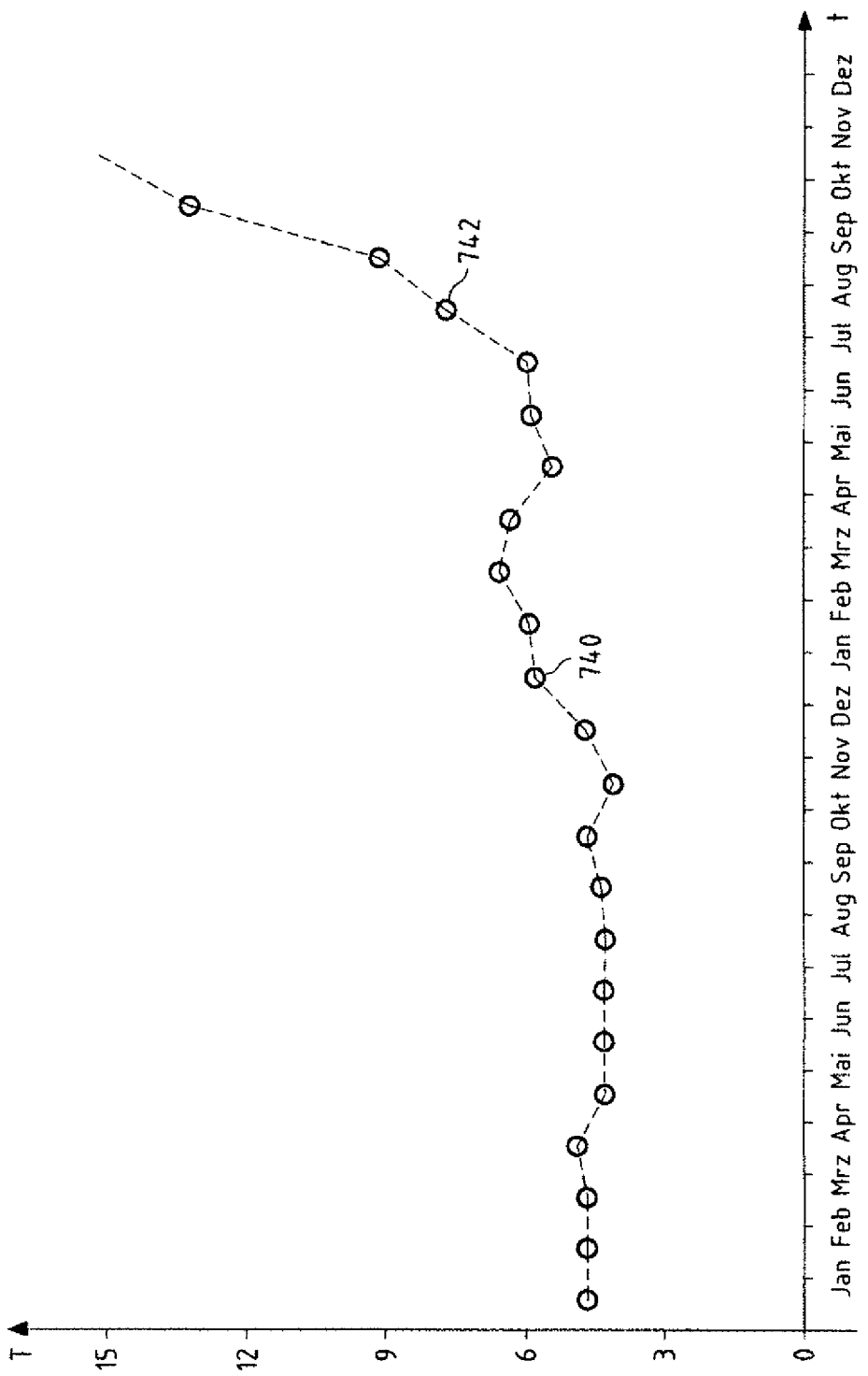
FIG. 7 shows a diagram with an exemplary profile of the temperature extremes depending on the time.

An exemplary, temporal profile of the operational operating point of a wind turbine 201 is shown in FIG. 7. As can be seen, the operating point in the example initially remains stable for about 12 months (at about 4.5 K). This is reflected, among other things, in a low standard deviation (e.g. 0.2 K). In particular, it can be detected in an evaluation step that at least one maximum permissible temperature change, which can be specified as an admissibility criterion, is not exceeded.

As further indicated by the reference sign 740, for January (Jan) an exceeding of a maximum permissible temperature change can be identified. Here it can be additionally identified that the maximum permissible temperature change was only exceeded by a small value. For example, different levels of permissibility can be specified for such a detection. A corresponding detection is a particularly reliable indicator for a change of a bearing 202, 204, in particular a damage of a bearing 202, 204, which, however, does not (yet) represent an operation-endangering condition, can be detected.

As described, an alarm message can be sent in step 304 in case of a corresponding detection. If no measures or insufficient measures are taken to remedy the damage, the time course of the operational operating point may look like the example shown in FIG. 7. In particular, the operative operating point may initially stabilize until a significant (further) change occurs at reference sign 742. At this point at the latest, consideration should be given to replace the damaged bearing.

Since both bearings 202, 204 are included in the determination of the differential temperature, the evaluation step can preferably detect whether the first bearing 202 or the further bearing 204 has a potential damage. An increase in temperature indicates a damage of the further bearing, a negative differential temperature indicates a damage of the first bearing. The approach according to the application appears particularly promising for the rotor bearings of wind turbines described above, but can also be transferred to other bearings, such as generator bearings or gearbox bearings. It is particularly important that a second measurement can be carried out in the vicinity of the system, for which the same thermal conditions apply. The approach can also be transferred from the mechanically loaded components described above to electrically loaded components, such as transformers or converters.

The great advantage of the method or system in accordance with the application is in particular that in a plurality of wind turbines these temperature data are often already available as historical data and can therefore be evaluated with little effort by an evaluation in accordance with the application. This makes it possible to set up a monitoring system to monitor the condition of these components/parts and to react quickly to changes.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for monitoring the condition of at least one component of a wind turbine which is loaded during the operation of the wind turbine, comprising
 sensing of a first temperature of a first loaded component of the wind turbine,
 sensing of at least one further temperature of a further loaded component of the wind turbine,
 wherein the first loaded component and the further loaded component have a thermal coupling to each other, wherein a thermal coupling exists if the first component and the second component experience at least a similar mechanical and/or electrical load, and detecting a damage of at least one of the loaded components based on the sensed first temperature and the sensed further temperature and at least one admissibility criterion in an evaluation step.

2. The method according to claim 1, wherein the method further comprises
determining a differential temperature by forming the difference between the sensed first temperature and the sensed further temperature,
wherein a damage of at least one of the loaded components is detected in the evaluation step based on the formed differential temperature and the at least one admissibility criterion.

3. The method according to claim 2, wherein
the sensing of a first temperature comprises the sensing of a first temperature profile during a specific time period,
the sensing of a further temperature comprises the sensing of a further temperature profile during a specific time period, and
determining a differential temperature comprises determining a differential temperature profile by forming the difference between the sensed first temperature profile and the sensed further temperature profile.

4. The method according to claim 3, wherein the method comprises
sensing the power generated by the wind turbine while sensing the first temperature profile and the further temperature profile,
wherein in the evaluation step temperature values of the differential temperature profile of at least one predeterminable time interval are assigned to the associated power values of the generated power during the time interval.

5. The method according to claim 4, wherein
in the evaluation step at least one temperature extremum is determined from the temperature values assigned to the associated power values for the at least one predeterminable time interval, and
the admissibility criterion is at least one reference temperature extremum of a differential reference temperature of at least one reference wind turbine.

6. The method according to claim 5, wherein
in the evaluation step, a plurality of temperature extremes from a correspondingly plurality of time intervals are evaluated.

7. The method according to claim 6, wherein, the evaluating comprises the detecting of changes in temperature extremes.

8. The method according to claim 7, wherein the detecting of changes in temperature extremes is the detecting of increases in temperature extremes.

9. The method according to claim 1, wherein the at least one admissibility criterion comprises at least one reference temperature of at least one reference wind turbine.

10. The method according to claim 9, wherein the at least one at least one reference temperature is a differential reference temperature of at least one reference wind turbine.

11. The method according to claim 2, wherein in the evaluation step, upon a detection of a damage of a loaded component by evaluating the sign of the change in the differential temperature, the loaded component from the two loaded components is identified which has the damage.

12. The method according to claim 1, wherein
the first and the further loaded component are each a mechanically loaded component, and/or
the first and the further loaded component are each an electrically loaded component.

13. The method according to claim 9, wherein the mechanically loaded component is a rotor bearing, generator bearing or transmission bearing.

14. The method according to claim 12, wherein the electrically loaded component is a transformer or converter.

15. A monitoring system for monitoring the condition of at least one component of a wind turbine which is loaded during the operation of the wind turbine, comprising:
at least one temperature sensing device, configured to sense a first temperature of a first loaded component of the wind turbine,
wherein the temperature sensing device is configured to sense at least one further temperature of a further loaded component of the wind turbine,
wherein the first loaded component and the further loaded component have a thermal coupling to each other, wherein a thermal coupling exists if the first component and the second component experience at least a similar mechanical and/or electrical load and
the monitoring system comprises at least one evaluation device configured to detect a damage of at least one of the loaded components based on the first temperature and the further temperature and at least one admissibility criterion in an evaluation step.

* * * * *